United States Patent
Abel

(10) Patent No.: US 6,227,247 B1
(45) Date of Patent: May 8, 2001

(54) POSITION DRIVEN HOT GAS PROPORTIONAL THRUSTER VALVE

(75) Inventor: Stephen G. Abel, Chandler, AZ (US)

(73) Assignee: Honeywell International, Morris Township, NJ (US)

(*) Notice: Subject to any disclaimer, the term of this patent is extended or adjusted under 35 U.S.C. 154(b) by 0 days.

(21) Appl. No.: 09/501,701

(22) Filed: Feb. 10, 2000

(51) Int. Cl.[7] .................................................. F16K 31/02
(52) U.S. Cl. ................. 137/625.62; 137/550; 251/30.03; 251/30.05
(58) Field of Search ................... 251/25, 30.01, 251/30.02, 30.05, 30.03; 137/625.62, 550

(56) References Cited

U.S. PATENT DOCUMENTS

| | | |
|---|---|---|
| 3,326,088 * | 6/1967 | Hayner et al. ............. 137/625.62 X |
| 3,910,314 | 10/1975 | Nicholson . |
| 4,922,963 | 5/1990 | Robinson . |
| 5,117,868 | 6/1992 | Wagner . |
| 5,240,041 | 8/1993 | Garnjost . |
| 5,697,401 * | 12/1997 | Shinoda et al. ............. 137/625.82 X |
| 5,979,862 * | 11/1999 | Wölfges ..................... 251/30.01 |

OTHER PUBLICATIONS

*Hydraulic Feedback Loop Eliminates Valve's Electronics,* "Design Applications," Charles J. Murray (Dec. 7, 1992).

* cited by examiner

*Primary Examiner*—Kevin Lee
(74) *Attorney, Agent, or Firm*—Keith Newburry, Esq.

(57) ABSTRACT

A thruster valve has a continuously positionable piston between a closed position and a maximum open position. The piston moves in response to the difference in pressure between the pressure in the intermediate annulus and the pressure behind the piston. A pivotable flapper valve regulates this pressure difference. When a change in thrust is required, the position of the flapper is changed causing a change in this pressure difference which causes the piston to move until the desired thrust level is obtained.

9 Claims, 1 Drawing Sheet

POSITION DRIVEN HOT GAS PROPORTIONAL THRUSTER VALVE

FIELD OF THE INVENTION

The present invention relates generally to gas valves and in particular to proportionally controlled gas thruster valves.

BACKGROUND OF THE INVENTION

Rockets and missiles are often guided by hot gas thruster valves that expel hot gas generated by the combusting of a solid propellant. Because of the difficulty associated with controlling and containing the hot gas, these valves are generally configured as on/off valve or pulse width modulated valves. A disadvantage to these types of valves is that their abrupt movement, on and off, can cause undesirable vibration and jitter in the vehicle and/or in the vehicle's guidance system. Another disadvantage is that these valves either provide maximum thrust or zero thrust and do not have the capability of providing a thrust level in between. In addition, the pressure of the solid propellant gas generator is dependent upon the exhaust area of these valves, and is thus subject to the ripple and uncertainty of pressure level which results. A system of proportional valves can provide trimming of the exhaust area, which in turn allows pressure control of the solid propellant motor. This feature can be exploited to also provide mission extension by selectively effecting high and low pressure, or high and low flow, segments of the overall mission. This leads to longer range and higher efficiency of the rocket or missile. On/off valves lack this capacity.

Accordingly, a need exists for a hot gas thruster valve that can operate smoothly and also provide intermediate thrust levels and solid propellant gas generator pressure control.

SUMMARY OF THE INVENTION

An object of the present invention is to provide a position driven proportionally controlled thruster valve capable of providing intermediate levels of thrust as a function of a position input to the valve.

The present invention accomplishes this object by providing a thruster valve having a thrust nozzle and a piston slideably mounted in the valve. The piston be positionable to close and open the thrust nozzle. A front annulus surrounding the piston receives a hot gas at a pressure Ps. Passages flow a portion of this gas to an intermediate annulus at a pressure Pf and to a back chamber at a pressure Pa. Both the intermediate annulus and the back chamber have a nozzle and corresponding metering slot configured so that in the steady state condition the sum of their flow areas is a constant. A flapper is disposed between those nozzles. Movement of the flapper changes the flow area of the nozzles which changes the pressure differential between Pf and Pa causing the piston to move. As the piston moves the flow areas of the metering slots respectively change. When the system returns to the steady state condition, the piston stops moving.

Thus by changing the position of the flapper, the piston can be moved continuously from a closed position to an open position thus eliminating the abrupt movements of the prior art on/off valves and providing proportional control of the thrust produced by the thrust nozzle.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWING

The sole FIGURE is a cross sectional schematic of the hot gas proportional thruster valve contemplated by the present invention.

DESCRIPTION OF THE PREFERRED EMBODIMENT

Figure 1:
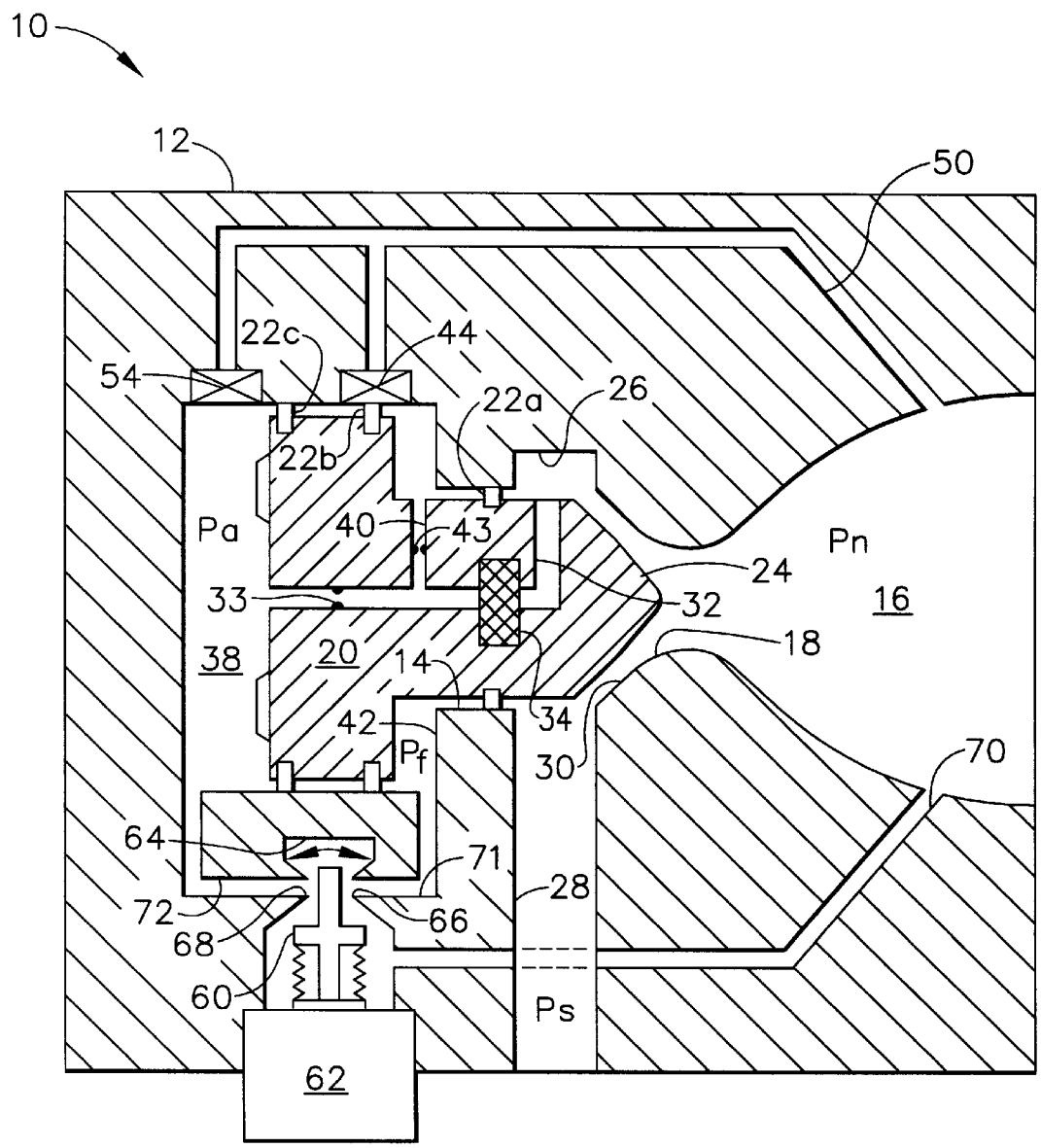

Referring to the drawing, a proportional hot gas thruster valve is generally denoted by the reference numeral 10. The valve 10 includes a housing or casing 12 having a cylindrical sleeve or cavity 14 open at one end. The casing 12 also has a nozzle 16 having an inlet 18 in opposed and spaced apart relation to the open end of the cavity 14. Slideably mounted in the cavity 14 is a poppet piston 20. The piston 20 is sealed within the sleeve 14 by three graphite ring seals 22a, 22b, and 22c. The head 24 of the piston 20 is conical and extends from the open end of the cavity 14 towards the inlet 18 of the nozzle 16. Disposed between the nozzle inlet 18 and the open end of the cavity 14 is an annulus 26 that surrounds the conical or curved head 24 of the piston. A first passage 28 brings the hot gas generated by the combusting of a solid propellant to the annulus 26 at pressure designated as Ps. The piston 20 is moveable between a closed position where head 24 seals against seat 30 to a fully open position where the hot gas flows unrestricted from the annulus 26 to the inlet 18.

A second passage 32 places the annulus 26 in fluid communication with actuator chamber 38 which is bound axially by piston 20 and cavity 14. Disposed in the second passage 32 is a filter 34, which may not be necessary depending on the cleanliness of the hot gas, and an orifice 33. In the preferred embodiment, the passage 32 and filter 34 are disposed in the piston 20. Alternatively, they can be disposed in the housing 12. A third passage 40 communicates between passage 32, downstream of the filter 34 and a second annulus 42 circumscribing the piston 20 and located between seals 22a and 22b. An orifice 43 is disposed in the passage 40. The pressure in annulus 42 is designated Pf. The pressure in chamber 38 is designated Pa.

A first metering orifice or restrictive pneumatic slot 44 places the annulus 42 in fluid communication with a passage 50 that communicates with low pressure region in the nozzle 16. The metering orifice 44 can have a fixed area or can be configured as a needle. In the preferred embodiment, the orifice 44 is comprised of two slots 180 degrees apart. The gas flowing through the orifice 44 experiences a pressure drop so that the downstream pressure is very low when compared to Pf. This pressure is designated Pn.

A second metering orifice or restrictive pneumatic slot 54 places the actuator chamber 38 in fluid communication with passage 50. The metering orifice 54 is configured like the orifice 44 in that it can be fixed area or a needle. In the preferred embodiment, the orifice 54 is comprised of two slots 180 degrees apart and the gas flowing through the orifice 54 experiences a pressure drop so that the downstream pressure is the same as the pressure downstream pressure of slots 44, that is Pn.

To the side of the piston 20 out of plane with the slots 44 and 54 is a flapper 60. The flapper 60 is coupled to a solenoid or torque motor 62 and is disposed in a flapper chamber 64 which is part of the housing 12. On opposite sides of the flapper 60 are a first nozzle 66 in fluid communication with annulus 42 and a second nozzle 68 in fluid communication with the actuator chamber 38. The flapper 60 is continuously positionable from a first position where nozzle 68 is closed to a second position where the nozzle 66 is closed and to all positions therebetween. The flapper chamber 64 vents to a low pressure area of the nozzle 16 through passage 70. Passages 71 and 72 port gas from chambers 42 and 38 to flapper nozzles 66 and 68, respectively.

Importantly, in the steady state condition when the piston 20 is not moving the sum of the flow areas of the nozzle 66 and the slot 44 equals a constant and the sum of the flow areas of the nozzle 68 and the slot 54 equals a constant.

In operation starting with the nozzle closed, that is head 24 abutting seat 30 and flapper 60 is positioned to close nozzle 68, a command for thrust is sent to the solenoid or torque motor 62 which moves the flapper 60 away from nozzle 68 and towards nozzle 66. The flow area of the nozzle 68 increases and the flow area of nozzle 66 decreases, thus upsetting the steady state condition. As a result, Pa decreases and Pf increases and the difference between these pressures causes the piston 20 to move away from the seat 30. As the piston 20 opens, the slot 44 opens and slot 54 closes. That is the flow area of slot 44 increases and the flow area of slot 54 decreases. When the flow areas of these slots, in combination with nozzle flow areas 66 and 68, return to the steady state condition, the piston 20 stops moving. Thus there is known relationship between thrust, position of the piston 20, the position of the flapper 60 and the current into the solenoid or torque motor 62. Thus, by adjusting the current applied to the torque motor, the piston can be moved continuously from a closed position to an open position thus eliminating the abrupt movements of the prior art on/off valves and providing proportional control of the thrust from the nozzle 16.

Various modifications and alterations of the above described thruster valve will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A thruster valve comprising:
   a housing having a sleeve disposed therein, said sleeve open at a first end;
   a thrust nozzle for producing thrust, the inlet of said nozzle in opposed relation to and spaced from said first end;
   a piston, extending from a head to a back, mounted in said sleeve and continuously moveable from a closed position where the head of said piston abuts said nozzle inlet to an open position where said head is spaced from said nozzle inlet;
   a front annulus surrounding the head of said piston for receiving a hot gas, said front annulus in fluid communication with said nozzle;
   a back chamber bounded by the back face of said piston and said housing;
   at least one intermediate annulus surrounding said piston and disposed between said front annulus and said back chamber,
   a plurality of passages for flowing the hot gas from said front annulus to said intermediate annulus and to said back chamber;
   a flapper chamber disposed in said housing, said flapper chamber having first and second nozzles in opposed relation, said first nozzle in fluid communication with said back chamber and said second nozzle is in fluid communication with said intermediate annulus;
   a flapper disposed in said flapper chamber and positionable from a first position closing said first nozzle to a second position closing said second nozzle;
   a first metering slot in fluid communication with said back chamber and a second metering slot in fluid communication with said intermediate annulus, said first metering slot and said first nozzle configured so that in the steady state condition the sum of their flow areas is a constant and said second metering slot and said second nozzle configured so that in the steady state condition the sum of their flow areas is a constant; and
   means for positioning said flapper.

2. The thruster valve of claim 1 further comprising at least two spaced part ring seals between said piston and said sleeve.

3. The thruster valve of claim 1 wherein said plurality of passages includes a first passage between said front annulus and said back chamber.

4. The thruster valve of claim 3 further comprising a filter disposed in said first passage.

5. The thruster valve of claim 3 wherein said plurality of passages includes a second passage between said first passage and said intermediate annulus.

6. The thruster valve of claim 5 wherein each of said first and second passages has an orifice disposed therein.

7. The thruster valve of claim 5 wherein each of said passages is disposed in said piston.

8. The thruster valve of claim 1 wherein said positioning means is a solenoid.

9. The thruster valve of claim 1 wherein said positioning means is a torque motor.

* * * * *